(12) United States Patent
Phillips et al.

(10) Patent No.: US 12,427,586 B2
(45) Date of Patent: *Sep. 30, 2025

(54) REMOTE PROGRAMMING OF A POWER TOOL

(71) Applicant: BLACK & DECKER INC., New Britain, CT (US)

(72) Inventors: Steven J. Phillips, Ellicott City, MD (US); Oleksiy Sergyeyenko, Baldwin, MD (US); Christopher W. Shook, Bel Air, MD (US); Wong Kun Ng, New York, NY (US); Kevin Wenger, Bel Air, MD (US)

(73) Assignee: BLACK & DECKER INC., New Britain, CT (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/335,775

(22) Filed: Jun. 15, 2023

(65) Prior Publication Data

US 2023/0321734 A1 Oct. 12, 2023

Related U.S. Application Data

(63) Continuation of application No. 16/871,357, filed on May 11, 2020, now Pat. No. 11,712,741, which is a continuation of application No. 15/875,203, filed on Jan. 19, 2018, now Pat. No. 10,661,355, which is a continuation of application No. 14/445,735, filed on
(Continued)

(51) Int. Cl.
*B23B 45/02* (2006.01)
*B25B 21/00* (2006.01)
*B25B 23/14* (2006.01)
*B25B 23/147* (2006.01)
(Continued)

(52) U.S. Cl.
CPC .............. *B23B 45/02* (2013.01); *B25B 21/00* (2013.01); *B25B 23/14* (2013.01); *B25B 23/147* (2013.01); *B25F 5/00* (2013.01); *G05B 19/4083* (2013.01); *B23B 2270/32* (2013.01); *G05B 2219/33192* (2013.01); *G05B 2219/45127* (2013.01)

(58) Field of Classification Search
CPC ......... B23B 45/02; B25B 21/00; B25B 23/14; B25B 23/147; B25F 5/00
See application file for complete search history.

(56) References Cited

U.S. PATENT DOCUMENTS

| | | | |
|---|---|---|---|
| 6,536,536 B1 * | 3/2003 | Gass ....................... | B25F 5/021 173/171 |
| 11,712,741 B2 * | 8/2023 | Phillips ................... | B23B 45/02 173/176 |

(Continued)

*Primary Examiner* — Michelle Lopez
(74) *Attorney, Agent, or Firm* — Stephen R. Valancius

(57) ABSTRACT

A drill system including a drill and a secondary computing device. The drill includes a housing, a controller, a wireless transceiver, a motor, and a chuck. The motor, the controller and the wireless transceiver are housed in the housing. The chuck is selectively driven by the motor. The secondary computing device includes a wireless transceiver which allows wireless communication between the drill and the secondary computing device. The secondary computing device further includes a user interface configured to allow an operator to change operating parameters of the drill. The operating parameters are configured to be automatically reset.

20 Claims, 17 Drawing Sheets

Related U.S. Application Data

Jul. 29, 2014, now Pat. No. 9,908,182, which is a continuation-in-part of application No. PCT/US2013/023798, filed on Jan. 30, 2013.

(60) Provisional application No. 61/898,152, filed on Oct. 31, 2013, provisional application No. 61/592,127, filed on Jan. 30, 2012.

(51) Int. Cl.
*B25F 5/00* (2006.01)
*G05B 19/408* (2006.01)

(56) References Cited

U.S. PATENT DOCUMENTS

2012/0160529 A1\* 6/2012 Eshleman ............... B25F 5/00
  173/1
2013/0327552 A1\* 12/2013 Lovelass ............... B25F 5/001
  173/176

\* cited by examiner

SPECIFY CHARACTERISTICS OF FASTENING APPLICATION:

FASTENER TYPE:

☐ WOOD SCREW
☐ MACHINE SCREW
☐ SHEET METAL SCREW

FASTENER LENGTH:

☐ LESS THAN 1"
☐ 1" TO 3"
☐ GREATER THAN 3"

SINGLE WORKPIECE:

☐ DRYWALL
☐ WOOD
☐ METAL

JOINT WORKPIECE:

FASTENER SIDE:

☐ DRYWALL
☐ WOOD
☐ METAL

JOINT SIDE:

☐ WOOD
☐ PRESSURE TREATED WOOD

FIG. 12

REMOTE PROGRAMMING OF A POWER TOOL

CROSS-REFERENCE TO RELATED APPLICATIONS

This application is a continuation of U.S. application Ser. No. 16/871,357 filed May 11, 2020, which is a continuation of U.S. application Ser. No. 15/875,203 filed Jan. 19, 2018, now U.S. Pat. No. 10,661,355 which is a continuation of U.S. application Ser. No. 14/445,735 filed Jul. 29, 2014, now U.S. Pat. No. 9,908,182 which claims the benefit of continuation-in-part of International Application No. PCT/US13/23798, filed Jan. 30, 2013, which claims the benefit of U.S. Provisional Application No. 61/592,127 filed on Jan. 30, 2012. This application also claims the benefit of U.S. Provisional Application No. 61/898,152 filed on Oct. 31, 2013. The entire disclosure of each of the above applications is incorporated herein by reference.

FIELD

The present disclosure relates to techniques for remote programming of power tools.

BACKGROUND

Power tools typically include controllers which are used to monitor and control various operating conditions of the tool. Control algorithms and parameters associated therewith are programmed into the controller at the time the power tool is manufactured. It is desirable to provide a simple method for updating the control algorithms and associated parameters after the power tool has been manufactured.

Fastener setting algorithms are one example of a control algorithm that is commonly found in a drill driver. In this example, operating conditions of the tool are monitored as a fastener is driven into a workpiece. When the head of the fastener is flush the surface of the workpiece, the torque applied to the output spindle is interrupted, thereby properly setting the fastener into the workpiece. Because the parameters used by the fastener setting algorithm are pre-programmed into the drill driver, these fixed parameter values are applied to a variety of fastening applications having different types of fasteners and different types of workpieces. Improper setting of the fastener or nuisance trips may occur depending, for example on the characteristics of the fastener or the workpiece. Therefore, it is also desirable to tailor the parameters of the fastener setting algorithm to the particular fastening application.

This section provides background information related to the present disclosure which is not necessarily prior art.

SUMMARY

This section provides a general summary of the disclosure, and is not a comprehensive disclosure of its full scope or all of its features.

A method is provided for controlling operation of a power tool, such as a drill driver. The method begins with one or more descriptors for a fastening application being received by a controller residing in the power tool, where the descriptors are indicative of a fastening application to be performed by the power tool and are received via a wireless data link from a computing device located remotely from the power tool. The descriptors are translated into a threshold value used by a fastener setting algorithm and the threshold value is stored in a data store of the power tool. During subsequent fastening operation performed using the tool, an operating parameter of the power tool is monitored and evaluated in accordance with the fastener setting algorithm, including the updated threshold value. Example operating parameters include current delivered to the motor and speed of the motor.

A power tool is also provided. The power tool is comprised generally of: a tool housing; a motor housed in the tool housing and connected to an output spindle to impart rotary motion thereto; a wireless transceiver housed in the tool; and a controller housed in the tool housing and interface with the wireless transceiver. The controller is configured to receive one or more descriptors for a fastening application and modifies a fastener setting algorithm based on the descriptors, where the descriptors are received via a wireless data link from a computing device located remotely from the power tool. During a drill mode, the controller controls operation of the motor according to the modified fastener setting algorithm.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 12 is an example user interface for specifying characteristics of a fastening application;

Corresponding reference numerals indicate corresponding parts throughout the several views of the drawings.

DETAILED DESCRIPTION

Example embodiments will now be described more fully with reference to the accompanying drawings.

Figure 1:
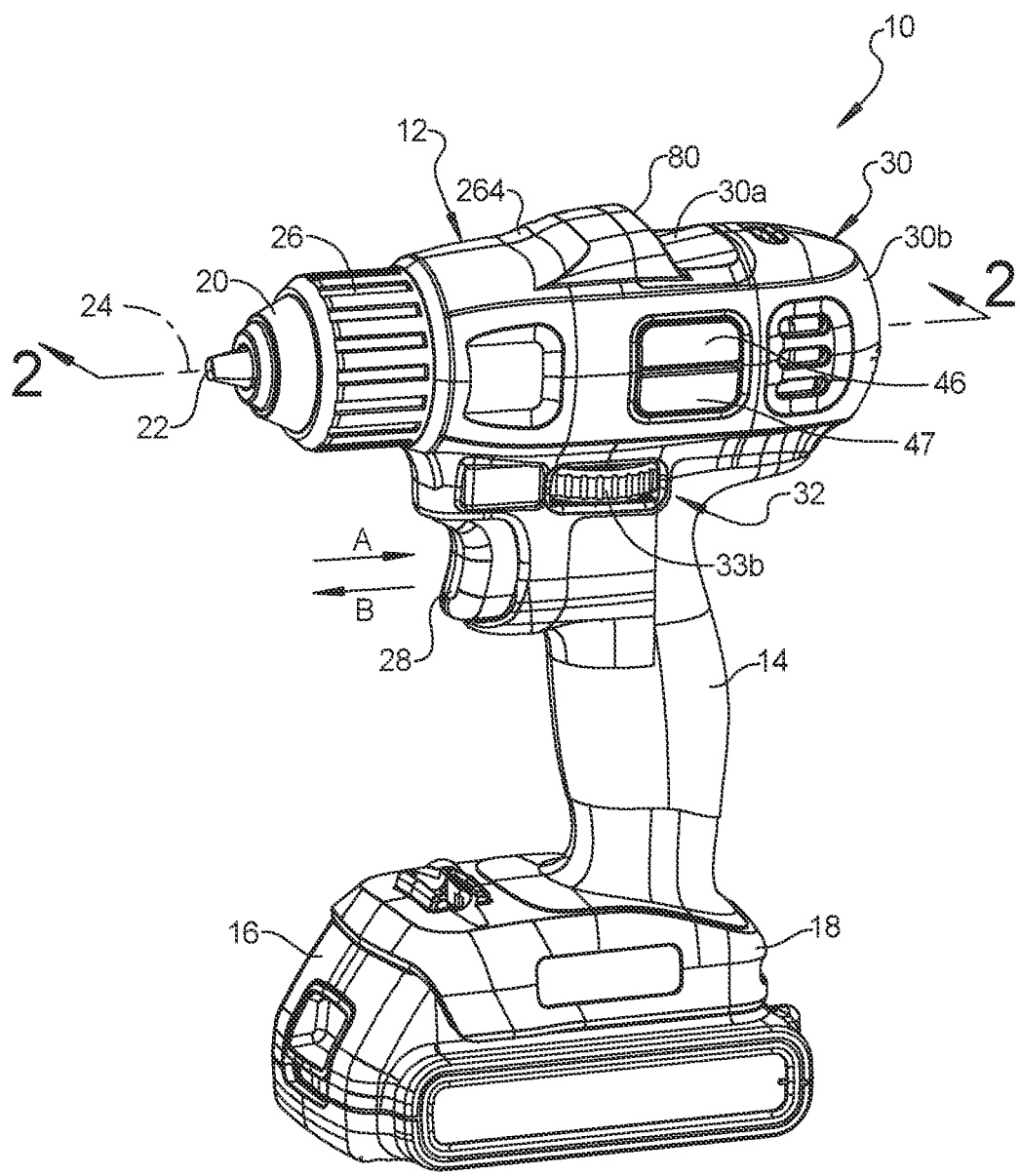
FIG. 1 is a perspective view of an example drill driver.

FIG. 1 depicts a portable hand-held power tool which in one form is a drill driver 10. The power tool includes a body 12 having a handle 14 shaped to be grasped in a single hand of a user, a rechargeable battery pack 16 that is releasably connected to a battery mounting portion 18 of body 12, and a chuck 20 having two or more clutch jaws 22 which are axially rotated with respect to a rotational axis 24. A clutch sleeve 26 is also rotatable with respect to rotational axis 24 that is used to manually open or close clutch jaws 22. While the following description is provided with reference to a drill driver, it is readily understood that some of the features set forth below are applicable to other types of power tools.

A manually depressible and return biased trigger 28 is provided to initiate and control operation of drill driver 10. Trigger 28 is operated by manually depressing in a trigger engagement direction "A" and returns in a trigger release direction "B" upon release. Trigger 28 is provided in a motor housing 30 that according to several aspects is divisible into individual halves, including a motor housing first half 30a and a motor housing second half 30b which can be made for example of molded polymeric material. Positioned adjacent to trigger 28 is a rotary potentiometer/switch assembly 32. A portion 33b of rotary potentiometer/switch assembly 32 extends freely outwardly from body second half 30b on a second or left hand side of body 12. A similar portion 33a extends freely outwardly from body first half 30a on a first or right hand side of body 12. Rotary potentiometer/switch assembly 32 provides several functions which will be described in reference to subsequent figures.

A display 80 is also provided with body 12. In one embodiment, the display is comprised of a six of LEDs arranged horizontally although the number and arrangement of LEDs is not limiting. In other embodiments, the display may be implemented using a LCD. Other types of displays are also contemplated by this disclosure.

Figure 2:
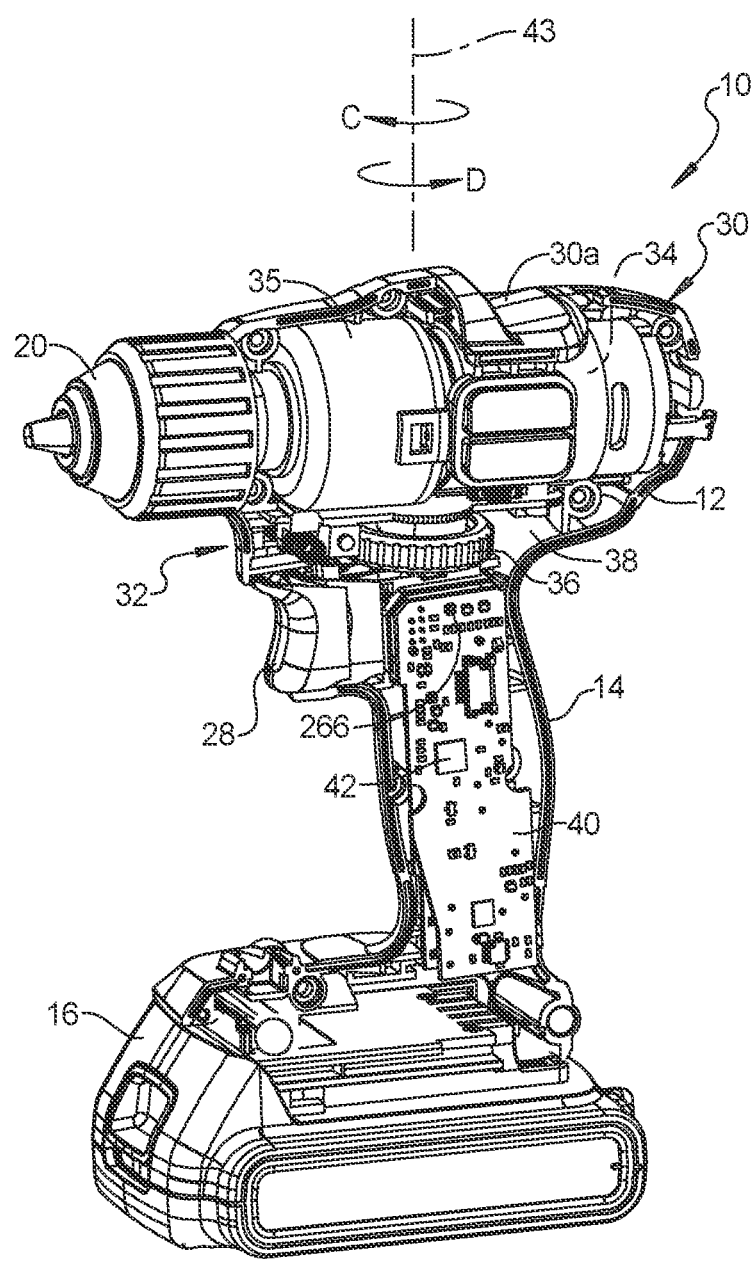
FIG. 2 is a partial cross sectional view taken along section line 2 of FIG. 1.

Referring to FIG. 2, with the motor housing second half 30b removed for clarity, drill driver 10 further includes a DC motor 34 and a motor transmission 35, the motor 34 operable using DC current from battery pack 16 and controlled by trigger 28. Motor 34 and motor transmission 35 are mounted in motor housing 30 and are drivably connected via an output spindle (not shown) to chuck 20 for rotation of chuck 20. It is readily understood that broader aspects of this disclosure are applicable to corded tools as well as battery powered tools.

Rotary potentiometer/switch assembly 32 includes a rotary member 36 in the shape of a circular disk wherein portion 33b extending outward from body 12 is a portion of rotary member 36 extending freely outwardly with respect to body 12 on the left hand side of body 12. The outwardly extending portions 33a, 33b of rotary member 36 allow manual rotation and a side-to-side displacement of rotary member 36 by the user of drill driver 10 from either the right hand side or left hand side of body 12. Rotary member 36 is positioned in a housing space 38 of motor housing 30 providing clearance for both axial rotation of rotary member 36, and side-to-side displacement of rotary member 36 in either a left hand or a right hand displacement such that rotary potentiometer/switch assembly 32 performs at least dual functions such as setting the chuck rotation direction as well as setting the clutch torque value. Further description for the rotary switch assembly can be found in U.S. Patent Application Publication No. 2013/0327552 which is incorporated in its entirety by reference herein. According to further aspects, rotary member 36 can be replaced by a sliding member, a rocking member, or other types in input components.

A printed circuit board (PCB) 40 is positioned in handle 14. PCB 40 supports components of an electronic control circuit and may includes a microcontroller 42 having a central processing unit (CPU) or the like for performing multiple functions of drill driver 10, at least one electrically erasable programmable read-only memory (EEPROM) function providing storage of data or selected inputs from the user of drill driver 10, and at least one memory device function for storing both temporarily and permanently saved data such as data lookup tables, torque values and the like for use by drill driver 10. According to other aspects (not shown), microcontroller 42 can be replaced by separate components including a microprocessor, at least one EEPROM, and at least one memory device, or implemented by comparable analog circuitry.

Figure 3:
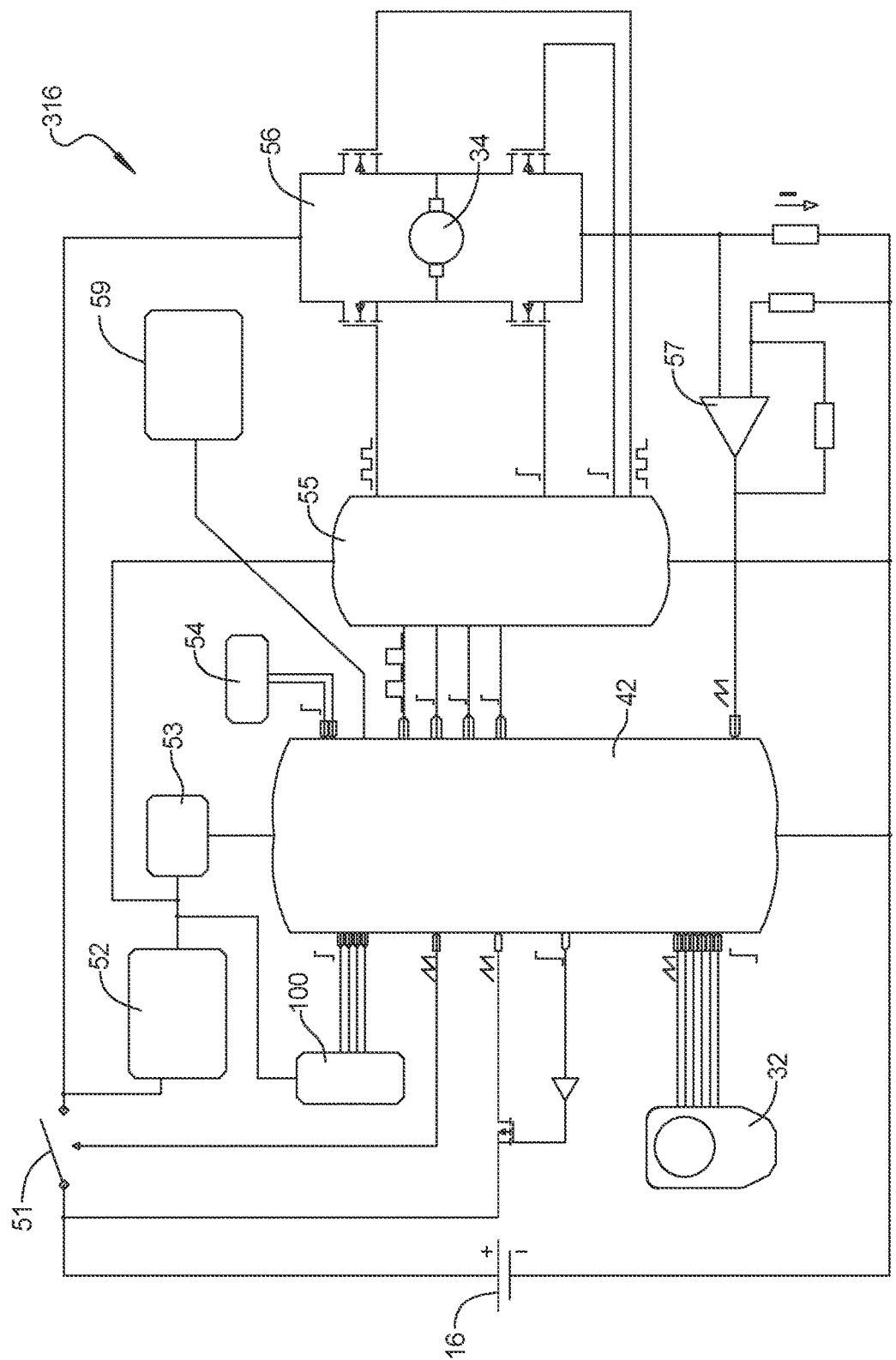
FIG. 3 is a schematic of an example control circuit for the drill driver.

A schematic of an example control circuit for the drill driver 10 is provided in FIG. 3. The battery 16 voltage is normally isolated when the trigger switch 51 is open. When trigger switch 51 is closed, for example by depressing trigger 28, a DC/DC 10-volt supply 52 is energized by battery 16. The DC/DC 10-volt supply 52 is a 10-volt DC regulator that supplies power to the display 80 and to an "H" bridge driver circuit 55. A 3-volt supply 53 may also connected to the DC/DC 10-volt supply 52. Three-volt supply 53 provides 3-volt power for operation of electronics logic. A mode select module 54 receives input from operation of either drill selector switch 46 or driver selector switch 47. The display 80, 3-volt supply 322, mode select module 324, and rotary potentiometer/switch assembly 32 are each connected to a microcontroller 42. Microcontroller 42 controls all peripheral features and interfaces, sets the direction of operation and the pulse-width module setting for "H" bridge control, and further processes all analog input signals for drill driver 10. An "H" bridge driver circuit 55 is also connected to microcontroller 42. "H" bridge driver 55 is a motor controller for a "H" bridge circuit 56 and controls forward, reverse, and breaking functions of motor 34. In an example embodiment, the "H" bridge 330 is a group of four metal-oxide-silicon field-effect transistors (MOSFETs) connected in an "H" configuration that drive motor 34 in both forward and reverse direction. A current amplifier 57 senses the current draw across a shunt resistor and amplifies the current signal for the microcontroller 42. A wireless transceiver 59 may also be interface with the microcontroller 42. In one embodiment, some of the components are interconnected a serial single-ended computer bus, such as one operating in accordance with the Inter-Integrated Circuit protocol.

In one aspect of this disclosure, the drill driver 10 is configured to operate in different modes. For example, the drill driver 10 may provide an input component (e.g., rotary member 36) that enables the tool operator to select a clutch setting for an electronic clutch. In one embodiment, the operator selects between a drill mode and a drive mode. In a drill mode, the amount of torque applied to the output spindle is ignored and transmission of torque is not interrupted by the controller 42 during tool operation; whereas, in a drive mode, torque applied to the output spindle is monitored by the controller 42 during tool operation. The controller 42 may in turn interrupt transmission of torque to the output spindle under certain tool conditions. For example, the controller may determine when a fastener being driven by the tool reaches a desired stopping position (e.g. flush with the workpiece) and terminate operation of the tool in response thereto without user intervention. It is readily understood that the selected clutch setting can be implemented by the controller 42 with or without the use of a mechanical clutch. That is, in some embodiments, the drill driver 10 does not include a mechanical clutch.

With reference to FIG. 1, the drill driver 10 can include individual switches for operator selection between either a drill mode or a drive mode. A drill selector switch 46 is depressed when drill operating mode is desired. Conversely, a drive selector switch 47 is depressed when drive operating mode is desired. The drill and drive operating modes are both operable with drill driver 10 regardless of the rotating direction of chuck 20. For example, operation in both the drill mode and drive mode are possible in a clockwise or forward rotational direction and also in a counter clockwise or reverse rotational direction of chuck 20. It is further noted that the selected one of either drill selector switch 46 or drive selector switch 47 may illuminate upon depression by the user. This provides further visual indication of the mode selected by the user.

Drill selector switch 46 and drive selector switch 47 may be actuated in different sequences to activate other tool operating modes. For example, the drive selector switch 47 may be pushed and held for a fixed period of time (e.g., 0.15 sec) to activate a high torque drive mode; whereas, pushing the driver selector switch 47 twice in the fixed period of time may activate a low torque drive mode. To indicate the different drive modes, the driver selector switch 47 may be lit steady when in the high torque drive mode and blinking when in the low torque drive mode. These two sequences are merely illustrative and other combinations of sequences are envisioned to activate these or other tool operating modes.

Figure 4A:
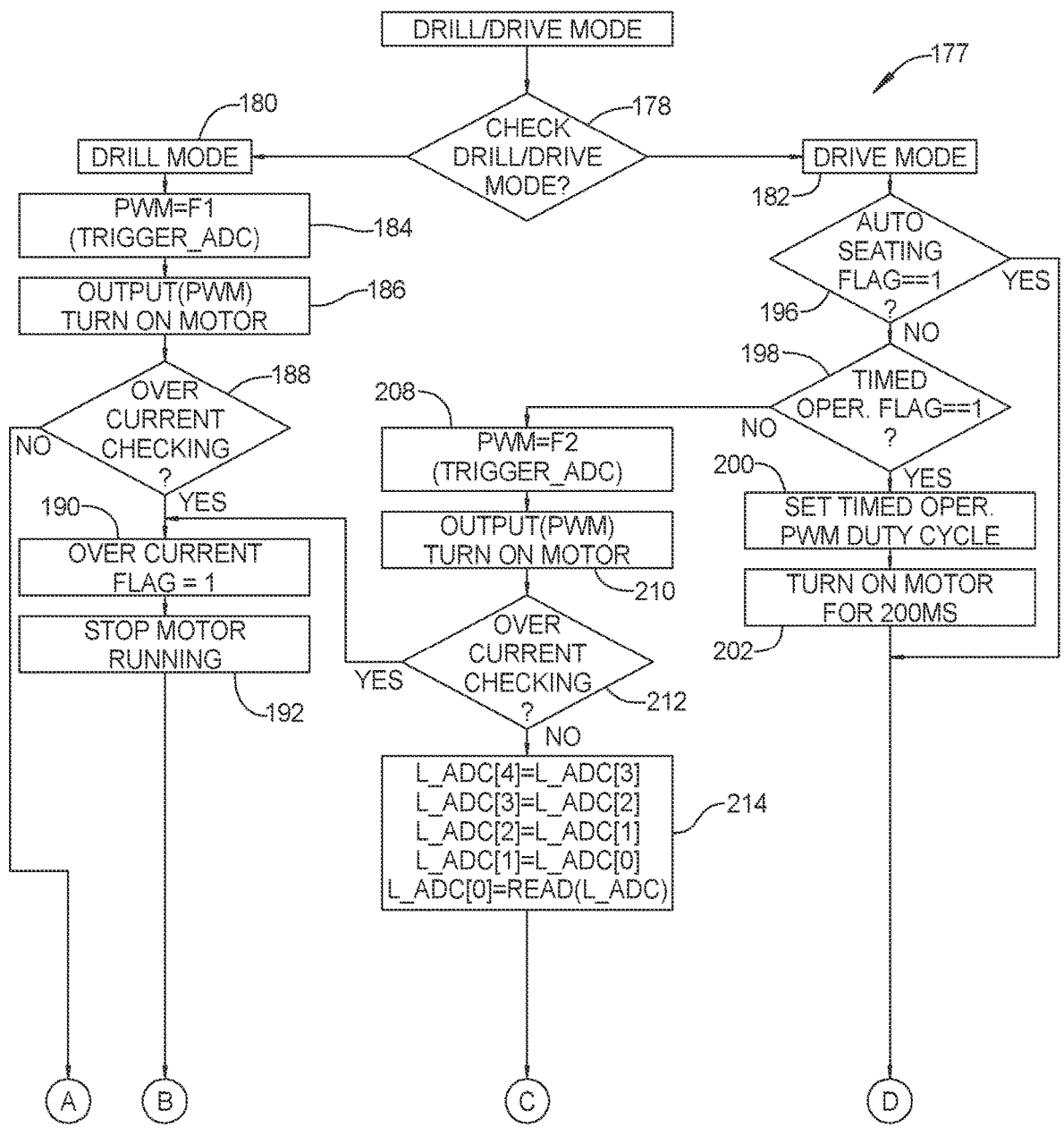
FIGS. 4A and 4B are flow diagrams depicting the operating steps of the drill driver in accordance with a mode selection.
Figure 4B:
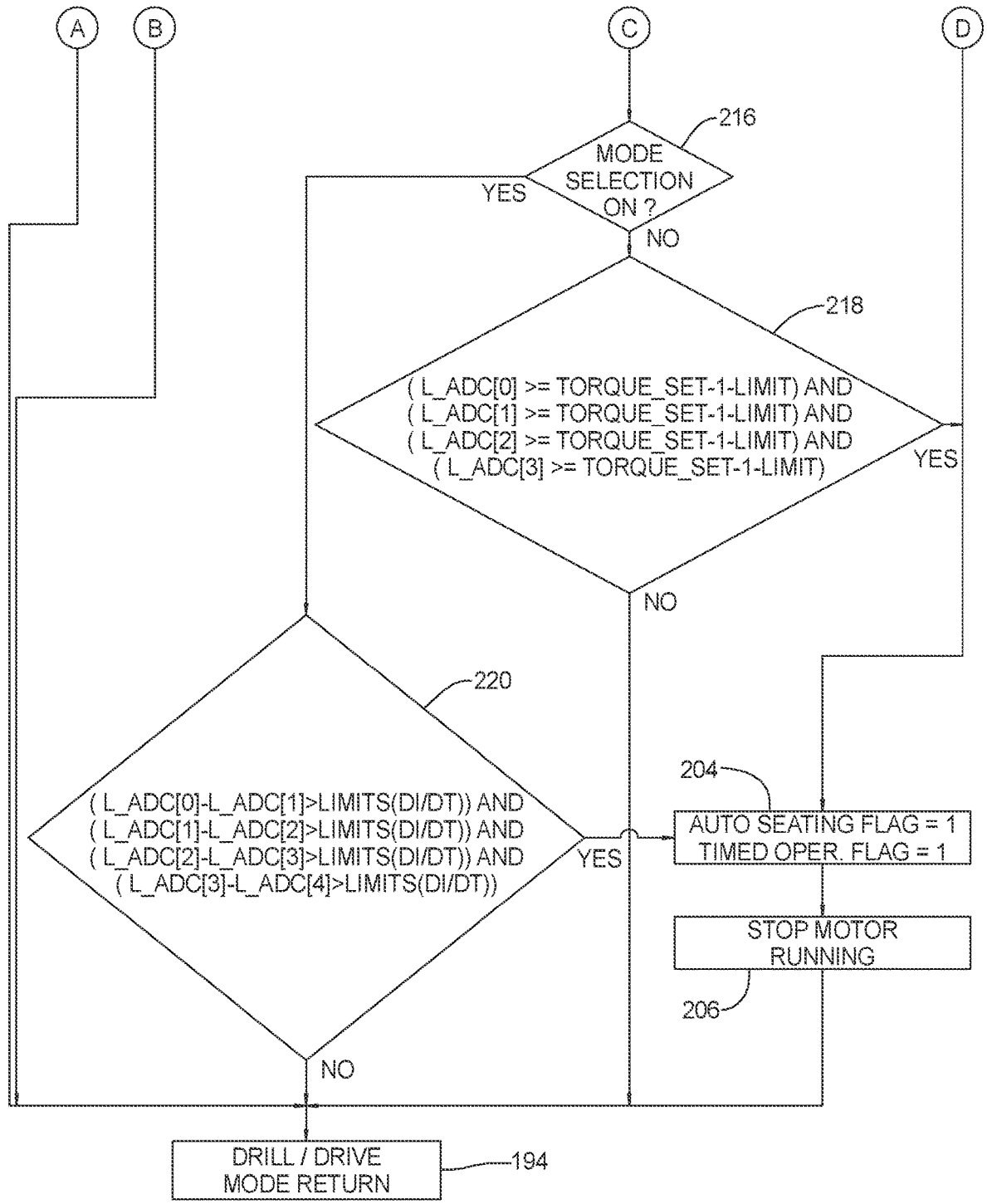

With reference to FIGS. 4A and 4B, a flow diagram 177 defines steps taken by the control circuit of drill driver 10 to distinguish between a drill mode 180 and a drive mode 182. In an initial check mode step 178, the status of drill selector switch 46 and/or drive selector switch 47 is checked to determine which input is received by the user. If the check mode step 178 indicates that drill mode 180 is selected, a trigger actuation first function 184 is initiated when trigger 28 is depressed. Following trigger actuation first function 184, a motor start step 186 is performed, thereby initiating operation of motor 34. During operation of the motor 34, an over-current check step is performed to determine if motor 34 is operating above a predetermined maximum current setting. If the over-current indication is present from motor over-current check 188, an over current flag 190 is initiated followed by a stop motor step 192 where electrical power to motor 34 is isolated. A drill drive mode return step 194 is then performed wherein continued operation of motor 34 is permitted after the user releases trigger 28. Returning to the motor over-current check 188, if an over-current condition is not sensed during the motor over-current check 188, continued operation of motor 34 is permitted.

With continuing reference to flow diagram 177, when driver selector switch 47 is depressed by the user and drive mode 182 is entered, a check is performed to determine if an auto seating flag 196 is indicated. If the auto seating flag 196 is not present, the following step determines if a timed operating system flag 198 is present. If the timed operating system flag 198 is present, in a next duty cycle setting step 200 a timed operating duty cycle is set. Following step 200, motor 34 is turned on for a predetermined time period such as 200 ms (milliseconds) in a timed operating step 202. Following timed operating step 202, in a seating/timed operating flag indication step 204, the control system identifies if both an auto seating flag and a timed operating flag are indicated. If both the auto seating flag and timed operating flag indication step 204 are indicated, operation of motor 34 is stopped in a stop motor running step 206.

Returning to timed operating system flag 198, if the flag is not present, a trigger activation second function 208 is performed which initiates operation of motor 34 in a timed turn on motor start 210. Following this and similar to motor over-current check 188, a motor over-current check 212 is performed. If an over-current condition is not indicated, a first routine 214 algorithm is actuated followed by a selection "on" check 216. If the selection "on" check 216 is negative, a second torque routine 218 algorithm is run, following which if a positive indication is present, returns to the seating/timed operating flag indication; and if negative, returns to the return step 194. If the selection "on" check performed at step 216 is positive, a third routine 220 algorithm is run which if positive thereafter returns to seating/timed operating flag indication step 204 and, if negative, returns to return step 194.

In some embodiments, the drive mode may be further divided into an automated drive mode and one or more user-defined drive modes, where each of the user-defined drive modes specify a different value of torque at which to interrupt transmission of torque to the output spindle. In the automated drive mode, the controller monitors the current being delivered to the motor and interrupts torque to the output spindle in response to the rate of change of current measures. Various techniques for monitoring and interrupting torque in an automated manner are known in the art, including algorithms for setting a fastener in a workpiece, and fall within the broader aspects of the disclosure. An improved technique for detecting when a fastener reaches a desired stopping position is further described below. In these embodiments, it is readily understood that the input component may be configured for selection amongst three or more operating modes, such as a drill mode, an automated drive mode and one or more user-defined drive modes.

Figure 5:
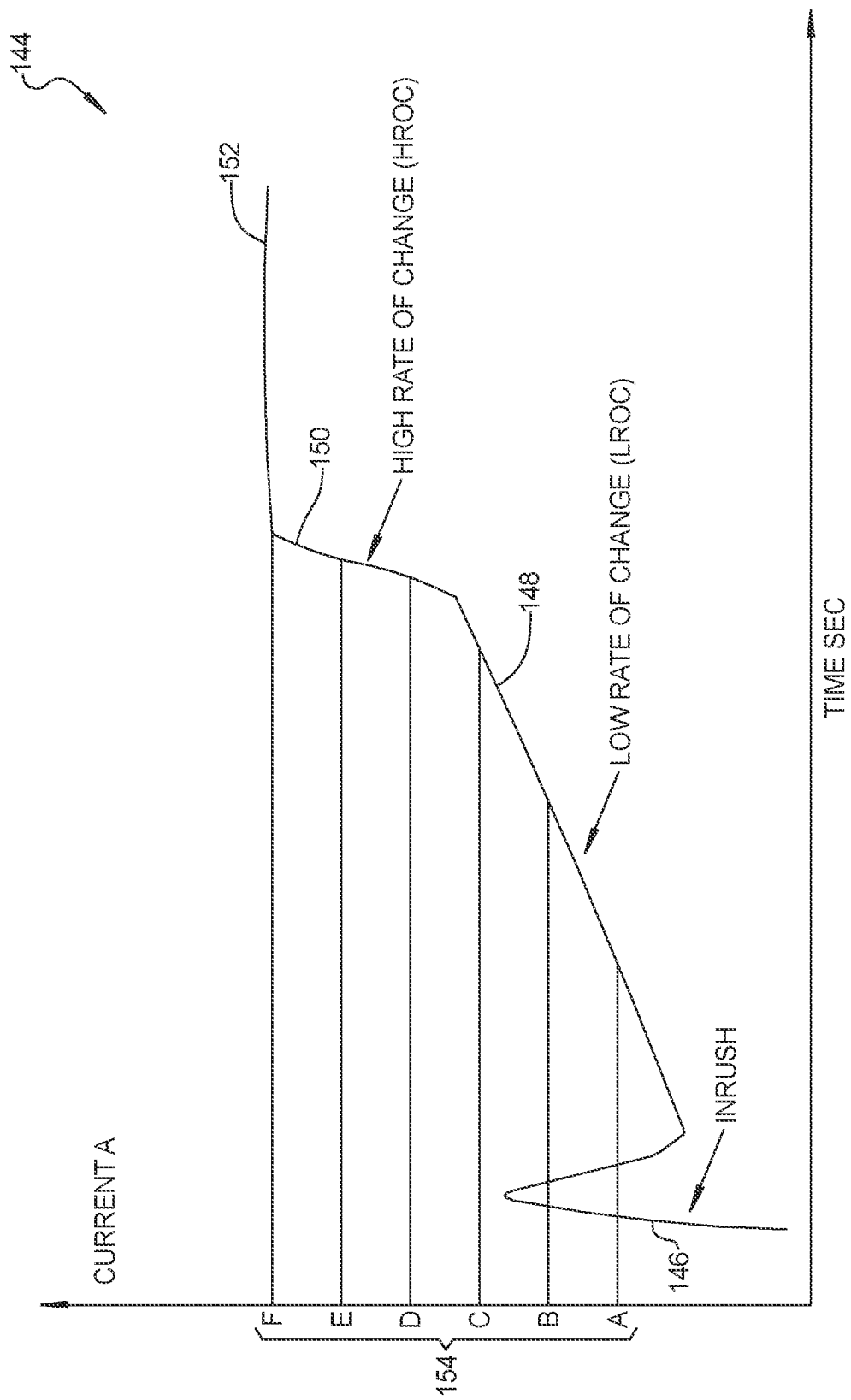
FIG. 5 is a graph depicting typical motor current draw over time during operation of the drill driver while setting a fastener into a workpiece.

FIG. 5 illustrates typical motor current draw over time during operation of the drill driver while setting a fastener into a workpiece. Initially, an inrush current 146 briefly peaks prior to the current draw continuing at a low rate of change (LROC) current 148. LROC current 148 corresponds to a body of a fastener such as a screw penetrating a material such as wood at a constant speed. At the time when a head of the fastener contacts and begins to enter the wood, the current draw changes to a high rate of change (HROC) current 150 for a brief period of time until a current plateau 152 is reached, defining when the fastener head is fully embedded into the wood. As is known, the level of current draw is proportional to the torque created by motor 34.

In a selected one of the user-defined drive modes, the controller sets a value of a maximum current threshold in accordance with the selected one of the user-defined drive modes and interrupts torque to the output spindle in response to the current measures exceeding the maximum current threshold. For example, the user selects one of the user-defined drives modes as the desired clutch setting using, for example rotary member 36. Current levels 154 designated as "a", "b", "c", "d", "e", "f" correlate to the plurality of predefined torque levels designated as "1", "2", "3", "4", "5", "6", respectively. During tool operation, the controller 42 will act to terminate rotation of the chuck when the current monitored by the controller 42 exceeds the current level associated with the selected user-defined drive mode (i.e., torque setting). The advantage of providing both types of drive modes (i.e., control techniques) within drill driver 10 includes the use of current level increments 154 which, based on prior operator experience, may indicate an acceptable predetermined torque setting for operation of chuck 20 in a specific material. Where the user may not be familiar with the amount of fastener headset in a particular material and/or with respect to a particular sized fastener, the automatic fastener setting algorithm can be selected, thereby providing for acceptable setting of the fastener for applications unfamiliar to the tool operator.

Figure 6:
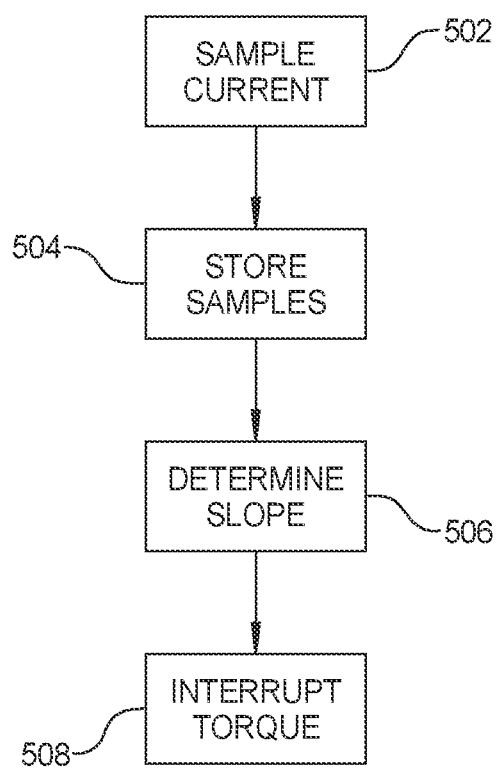
FIG. 6 is a flowchart providing an overview of an example fastener setting algorithm.

FIG. 6 illustrates an improved fastener setting algorithm for controlling operation of the drill driver when driving a fastener in the automated drive mode. Briefly, the current delivered to the electric motor is sampled periodically at 502 by the controller of the drill driver. The current measures most recently sampled by the controller are stored at 504 in a memory of the drill driver. From the most recently sampled current measures, a slope for the current measures is determined at 506 by way of linear regression. Linear regression is used because it has a better frequency response making it more immune to noise as compared to conventional computation methods. When a fastener being driven by the drill driver reaches a desired stopping position, torque transmitted to the output shaft is interrupted at 508 by the controller. The desired stopping position is determined based in part on the slope of the current measures as will be further described below.

Figure 7:
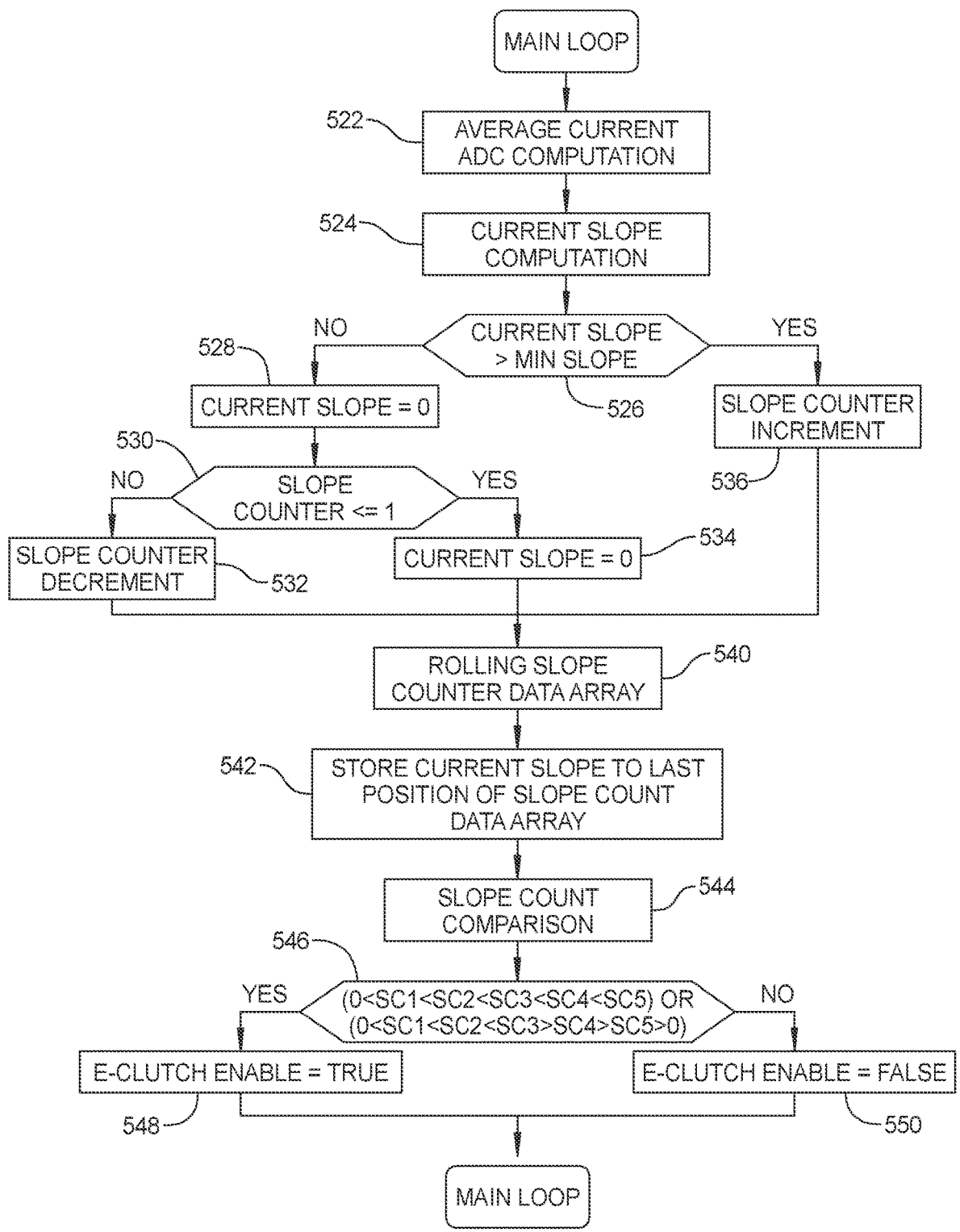
FIGS. 7 and 8 are diagrams further illustrating the example fastener setting algorithm.
Figure 8:
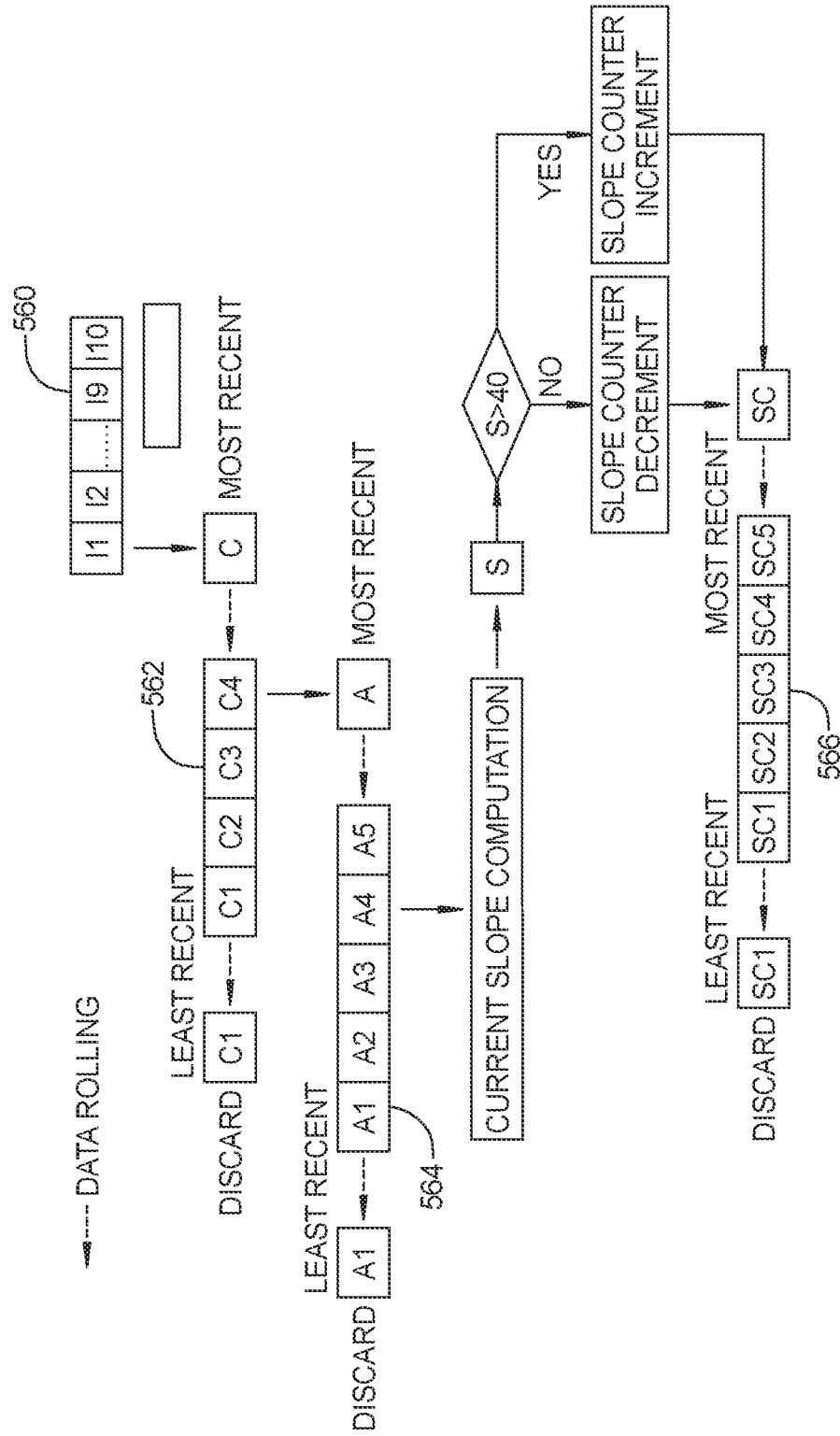

FIGS. 7 and 8 further illustrate the improved fastener setting algorithm. Current delivered to the electric motor is sampled periodically by the controller of the drill driver. In an example embodiment, the controller can ignore current samples captured during an inrush current period (e.g., 180 ms after trigger pull). Whenever there is a change in the trigger position (i.e., change in PWM duty cycle), the controller will stop sampling the current until the inrush current period has lapsed. In some embodiments, the automated technique is implemented by the controller regardless of the position of the trigger switch. In other embodiments, the automated technique is only implemented by the controller when the trigger position exceeds a predefined position threshold (e.g., 90%). Below this position threshold, the tool operates at lower speeds, thereby enabling the tool operator to set the fastener to the desired position without the need for the automated fastener setting technique.

Current measures may be digitally filtered before computing the current change rate. In an example embodiment, current is sampled in 15 milliseconds intervals. During each interval, the controller will acquire ten current measures as indicated at 560 and compute an average from the ten measures although more or less measures may be acquired during each interval. The average for a given interval may be considered one current sample and stored in an array of current samples indicated at 562 in FIG. 8, where the array of current samples stores a fixed number (e.g., four) of the most recently computed values. The controller will then compute an average from the current samples in the array of current samples. The average for the values in the array of current samples is in turn stored in a second array as indicated at 564 in FIG. 8, where the second array also stores a fixed number (e.g., five) of the most recently computed averages. These averaged current measures can then be used to determine the rate of current change. Other techniques for digitally filtering the current measures are also contemplated by this disclosure.

With continued reference to FIG. 7, the slope of the current is determined at 524 from the digitally filtered current measures. In an example embodiment, a linear regression analysis is used to compute the slope. In a scatter plot, the best fit line of the scatter data is defined by the equation y=a+bx, where the slope of the best fit line can be defined as $$b = \frac{\sum xy - (\sum x \sum y)/n}{\sum x^2 - (\sum x)^2/n},$$

where n is the number of data points. The intercept will be ignored in this disclosure. For illustration purposes, assume data scatter plot with current values for y of [506,670,700, 820,890] corresponding to sample values of [1, 2, 3, 4, 5], such that n=5. Using linear regression, the slope b of the best fit line is equal to 91.8. While a simple linear regression technique has been explained, other linear regression techniques are also contemplated by this disclosure.

Slope of the current measures may be used as the primary indicator for when the fastener has been set at a proper depth in the workpiece. Particularly, by using the slope of the current, the tool is able to determine when the tool is in the HROC (of current) area shown in the graph of FIG. 5. In the example embodiment, a slope counter is maintained by the controller. The current slope is compared at 524 to a minimum slope threshold. For example, the minimum slope threshold may be set to a value of 40. This value may be set such that slope values exceeding the minimum slope threshold are indicative of the HROC 150 range shown in FIG. 5. The slope threshold value may be derived empirically for different tools and may be adjusted according to the sampling time, motor attributes and other system parameters. In embodiments where the automated technique is implemented by the controller only when the trigger position exceeds a predefined position threshold, minor variations in trigger position (e.g., 10% from a baseline position) can be ignored once the current slope exceeds the minimum slope threshold and until such time as the fastener has been set and the torque to the output spindle is interrupted.

The slope counter is adjusted in accordance with the comparison of the current slope to the minimum slope threshold. The slope counter is incremented by one when the computed slope exceeds the minimum slope threshold as indicated at 536. Conversely, the slope counter is decremented by one when the computed slope is less than or equals the minimum slope threshold as indicated at 532. When the slope is less than or equal to the minimum slope threshold, the value of the current slope is also set to zero as indicated at 528. In the event the slope counter is equal to zero, the slope counter is not decremented further and the slope counter remains at zero as indicated at 534. Following each adjustment, the value of the slope counter is stored in an array of slope counts as indicated at 566 in FIG. 8, where the array of slope counts stores a fixed number (e.g., five) of the most recent slope count values.

Next, the slope counts are evaluated at 546 in relation to a fastener criteria. The fastener criteria at step 546 includes both a setting criteria, which is indicative of a desired stopping position for the fastener being driven by the tool, and a default criteria. The setting criteria and default criteria may be used together, as shown in 546 of FIG. 7, or only one of the criteria may be used. The setting criteria will be described first. In the setting criteria a fastener is assumed to have reached a desired stopping position when the slope counts increase over a series of values stored in the array of slope counts, where the series of values may be less than or equal to the total number of values stored in the entire array. In this example, each slope count value in the array is compared to an adjacent slope count value starting with the oldest value. The setting criteria is met when each value in the array is less than the adjacent value as compared from oldest value to the most recent value. For example, if the array is designed to hold five slope count values (SC1 through SC5), the setting criteria may be met when the consecutive count values are each increasing—i.e., SC1<SC2<SC3<SC4<SC5. In other words, the setting criteria is satisfied when the controller detects five successive computer slope values greater than the predetermined minimum slope threshold.

As noted above, the setting criteria may not use the entire array of values. For example, the array may be designed to hold five slope count values, but the setting criteria may be set such that an increase of counts over a series of four values (e.g. SC2<SC3<SC4<SC5) is sufficient. Other variations regarding the particular number of counts required are also contemplated.

The fastening criteria evaluated at step 546 may also include a default criteria. In some instances, the setting criteria described above with respect to FIGS. 7 and 8 may fail to trigger due to, for example, an anomaly reading or variations in a workpiece which result in the controller failing to detect the occurrence of the above-described setting criteria. In that case, there may be an additional criteria serving as a default criteria. In the default criteria, a fastener is assumed to have reached, or passed, a desired stopping position when the slope count peaks within a series of values stored in the array. In other words, if after detecting successive slope values that exceed the minimum slope threshold, the controller now detects successive slope values less than the minimum slope threshold, it is apparent the above-described setting criteria will not be met.

As with the setting criteria, the series of values may be less than or equal to the number of values stored in the entire array. In this example, slope count values in the array are again compared to each other. The default criteria is met when the slope count values in the array increase from the oldest value to an intermediate peak value and then decrease from the intermediate peak value to the most recent value. For example, the default criteria may be met if SC1<SC2<SC3>SC4>SC5. Of course, other particular default criteria may be used. For example, the default criteria may require more successive increases or more successive declines than that provided in the example above (e.g., SC1<SC2<SC3<SC4>SC5>SC6>SC7; or SC1<SC2>SC3>SC4; etc.). In this embodiment shown in FIG. 7, the setting criteria and default criteria are used together. However, in an alternative embodiment, each may be used alone. Other types of setting and default criteria are also contemplated by this disclosure.

Torque transmitted to the output spindle is interrupted at 548 when the slope counts meet the setting criteria or default criteria; otherwise, tool operation continues as indicated at 550. Torque may be interrupted in one or more different ways including but not limited to interrupting power to the motor, reducing power to the motor, actively braking the motor or actuating a mechanical clutch interposed between the motor and the output spindle. In one example embodiment, the torque is interrupted by braking the motor, thereby setting the fastener at the desired position. To simulate the electronic clutching function, the user may be subsequently provided with haptic feedback. By driving the motor back and forth quickly between clockwise and counter-clockwise, the motor can be used to generate a vibration of the housing which is perceptible to the tool operator. The magnitude of a vibration is dictated by a ratio of on time to off time; whereas, the frequency of a vibration is dictated by the time span between vibrations. The duty cycle of the signal delivered to the motor is set (e.g., 10%) so that the signal does not cause the chuck to rotate. Operation of the tool is terminated after providing haptic feedback for a short period of time. It is to be understood that only the relevant steps of the technique are discussed in relation to FIG. 7, but that other software-implemented instructions may be needed to implement the technique within the overall operation of the tool.

Figure 9:
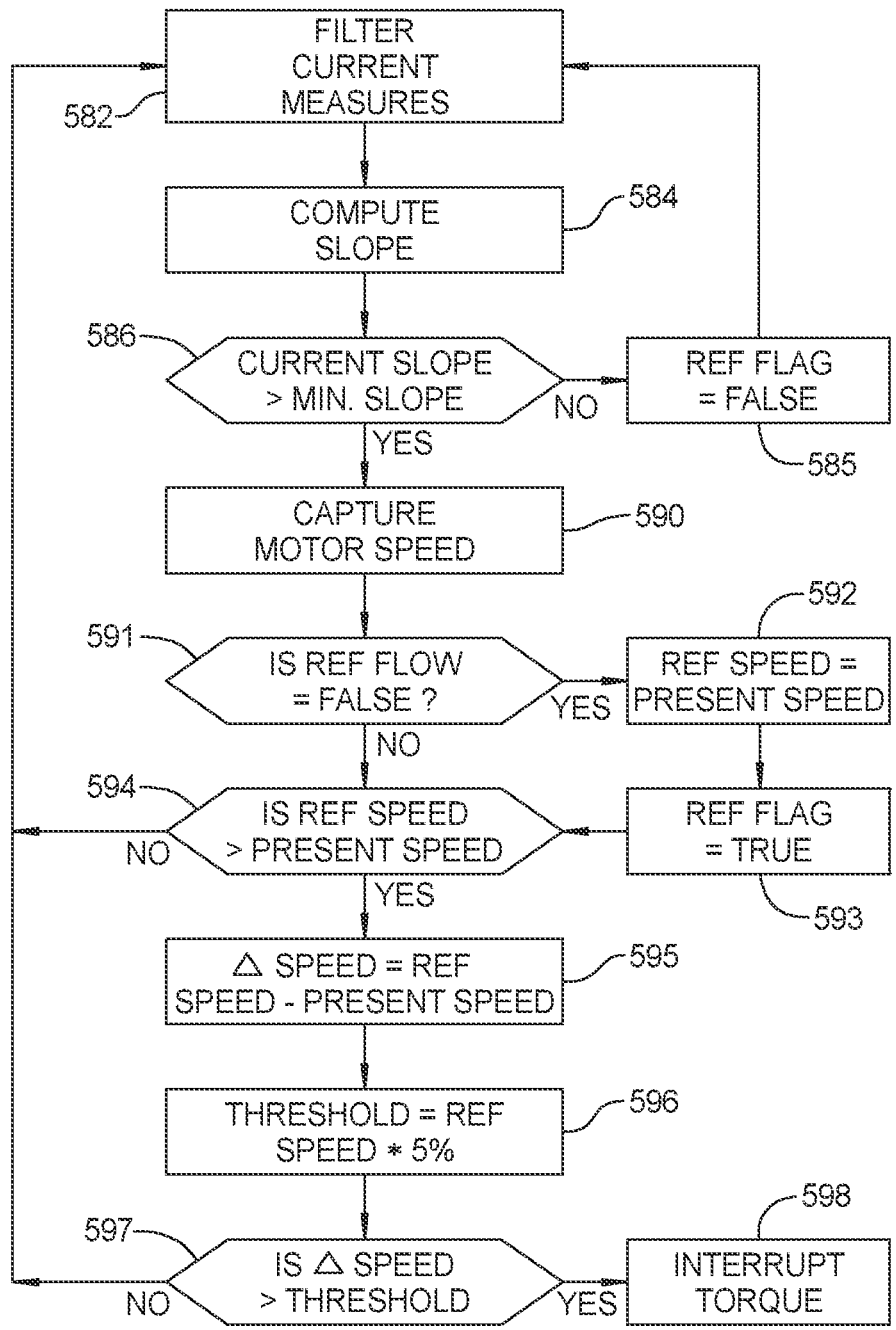
FIG. 9 is a diagram depicting a variant of the example fastener setting algorithm.

FIG. 9 illustrates an additional technique for controlling operation of the drill driver when driving a fastener in the automated drive mode. Current delivered to the electric motor can be sampled and filtered at 582 by the controller in the same manner as described above in relation to FIG. 7. Likewise, the slope of the current samples can be determined at 584 in the manner described above.

In this technique, motor speed is used as a secondary check on whether to interrupt transmission of torque to the output spindle but only when the current slope exceeds a minimum slope threshold. Accordingly, the current slope is compared at 586 to a minimum slope threshold (e.g., with a value of 40). The secondary check proceeds at 588 when the current slope exceeds the minimum slope threshold; otherwise, processing continues with subsequent current sample as indicated at 582.

To perform the secondary check, motor speed is captured at 588. In one example embodiment, motor speed may be captured by a Hall effect sensor disposed adjacent to or integrated with the electric motor. Output from the sensor is provided to the controller. Other types of speed sensors are also contemplated by this disclosure.

In the example embodiment, the controller maintains a variable or flag (i.e., Ref_RPM_Capture) to track when the current slope exceeds the minimum slope threshold. The flag is initially set to false and thereafter remains false while the present slope is less than the minimum slope threshold. At the first occurrence of the current slope exceeding the minimum slope threshold, the flag is false and the controller will set a reference motor speed equal to the present motor speed at 592. The reference motor speed is used to evaluate the magnitude of decrease in motor speed. In addition, the flag is set to true at 593 and will remain set to true until the current slope is less than the minimum slope threshold. For subsequent and consecutive occurrences of the current slope exceeding the minimum slope threshold, the flag remains set to true and reference speed is not reset. In this way, the flag (when set to true) indicates that preceding slope values have exceeded the minimum slope threshold.

Next, the present speed is compared at 594 to the reference speed. When the motor is slowing down (i.e., the reference speed exceeds the present speed), a further determination is made as to the size of the decrease. More specifically, a difference is computed at 595 between the reference speed and the present motor speed. A difference threshold is also set at 596 to be a predefined percentage (e.g., 5%) of the reference speed. The predefined percentage can be derived empirically and may vary for different tool types. The difference is then compared at 597 to the difference threshold. Processing of subsequent current sample continues until the difference between the reference speed and the present speed exceeds the difference threshold as indicated at 597. Once the difference between the reference speed and the present speed exceeds the difference threshold (and while the motor speed is decreasing), transmission of torque to the output spindle is interrupted at 598. It is to be understood that only the relevant steps of the technique are discussed in relation to FIG. 9, but that other software-implemented instructions may be needed to implement the technique within the overall operation of the tool. Furthermore, the secondary check described above in relation to FIG. 9 is intended to work cooperatively (e.g., in parallel with) the technique described in FIGS. 7 and 8. It is also envisioned that this technique may be implemented independent from the technique described in FIGS. 7 and 8 as a method for automatically setting a fastener in a workpiece.

Figure 11A:
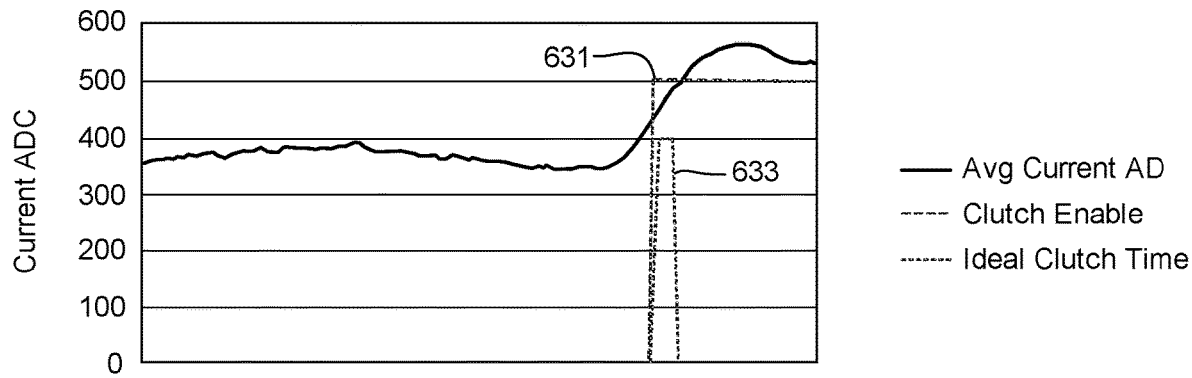
FIG. 11A-11C are graphs illustrating the average current being delivered to the motor of the drill driver during different fastening applications.
Figure 11B:
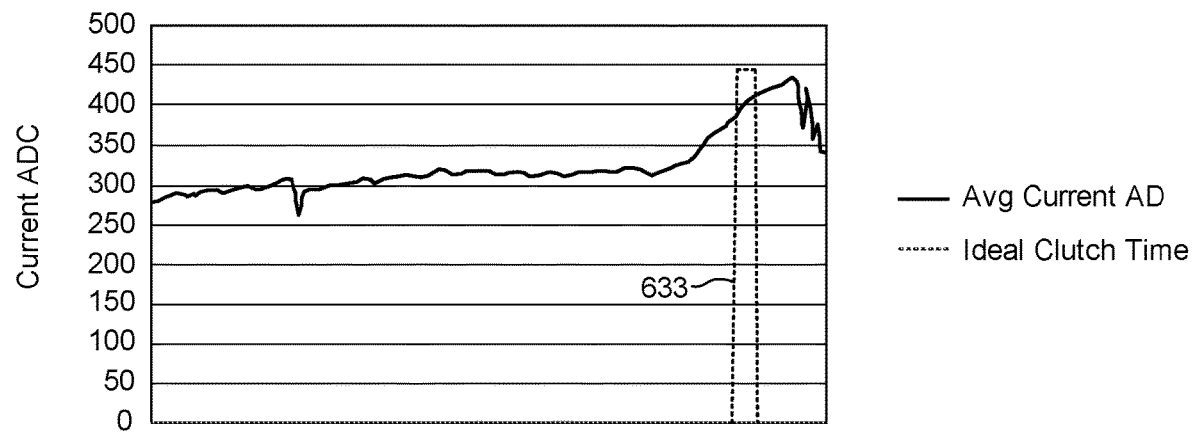
Figure 11C:
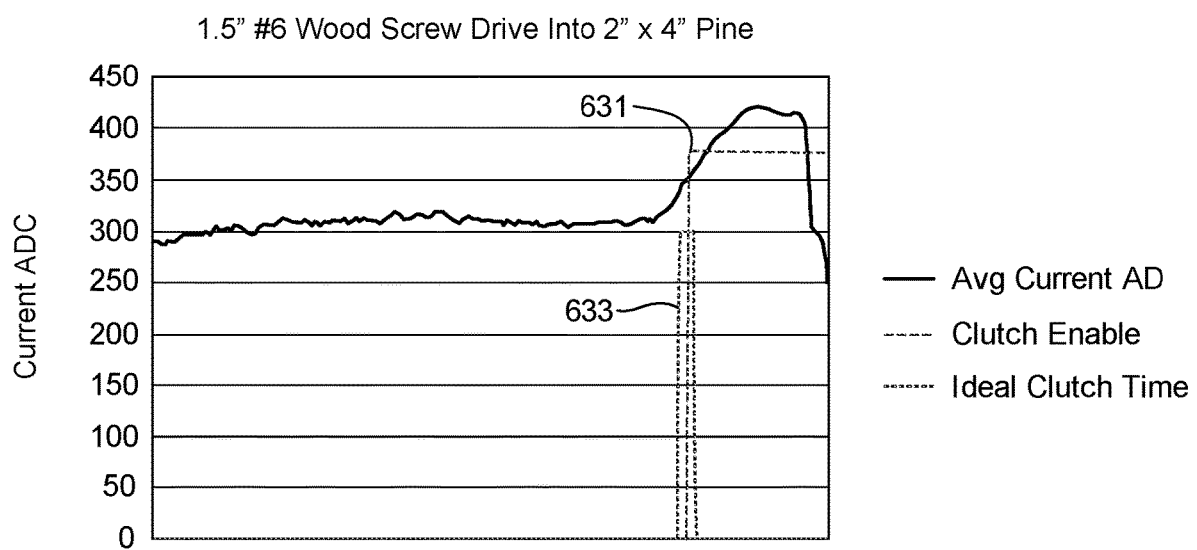

Fastener setting algorithms such as the ones described above typically employ threshold values having fixed values. Depending on the fastening application, these fixed parameter values may lead to improper setting of the fastener in the workpiece. FIGS. 11A-11C illustrate how a threshold value for a fastener setting algorithm can vary with the characteristics of the fastener. For illustration purposes, reference is made to the fastener setting algorithm described in relation to FIG. 7. In this algorithm, the minimum slope threshold serves as an example parameter that is tailored and has a baseline value of 68. It is understood that the baseline value for the slope threshold may be derived empirically and will depend on the operating characteristics of the drill driver. While particular reference is made below to a fastening application, it is understood that the concept of capturing descriptors for a task being undertaken and tailoring the operating parameters of the power tool are applicable more generally to other applications as well.

FIG. 11A depicts the average current being delivered to the motor of the drill driver during a first example application. In the first example application, a 1.5" #8 wood screw is being driven into a 2"×4" piece of pine. Using the baseline value for the minimum slope threshold, it is noted that the actual time at which the clutch was enabled as indicated at 631 closely correlates to the ideal time at which to enable the clutch as indicated at 633. Thus, the baseline value for the minimum slope threshold serves as a suitable setting for this application.

FIG. 11B depicts the average current being delivered to the motor of the drill driver during a second example application. In the second application, a 1.5" wood screw is again being driven into a 2"×4" piece of pine. In this case, the fastener type is changed to a #6 wood screw. The ideal time at which to enable the clutch is again indicated at 633. Because the diameter of the #6 wood screw is smaller than the diameter of the #8 wood screw, the computed current slope never exceeds the baseline value of the minimum slope threshold and the clutch is not enabled. Conversely, the clutch is enabled when the minimum slope threshold is adjusted to a lower value (e.g., 37) as shown in FIG. 11C. In this case, the time at which the clutch is enabled as indicated at 631 is again closely correlated to the ideal time at which to enable the clutch as indicated at 633. It follows that the minimum slope threshold as well as other operating parameters of the drill driver may be adjusted to better fit the intended application.

Figure 10:
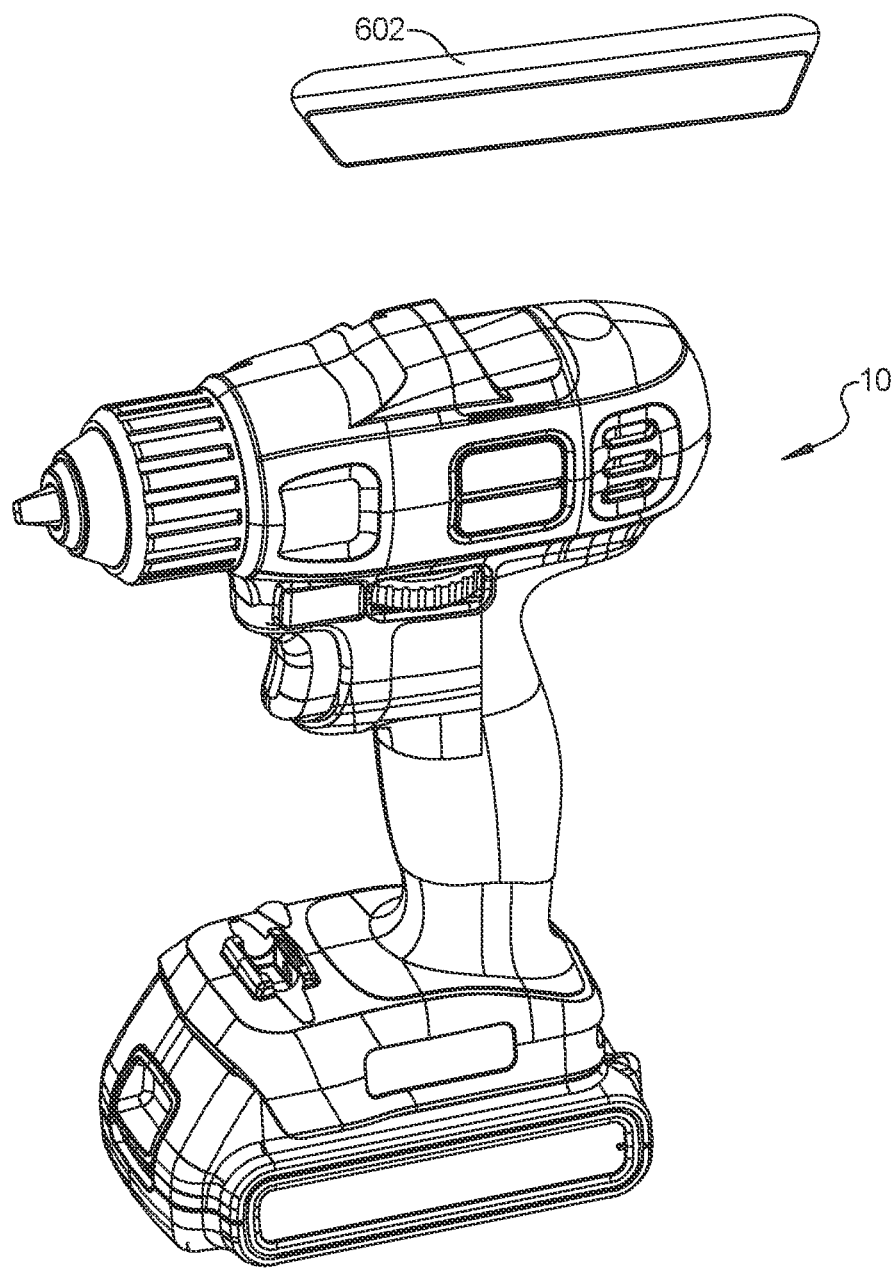
FIG. 10 is a diagram depicting the drill driver interface with a secondary computing device.

In another aspect of this disclosure, a technique is provided for remotely programming operating parameters of the drill driver 10 through the use of a secondary computing device 602 as shown in FIG. 10. In an example embodiment, the secondary computing device 602 is a smart phone although other types of portable computing devices such as tablets are contemplated by this disclosure. The drill driver 10 and the secondary computing device 602 are both configured with a wireless transceiver operating, for example in accordance with Bluetooth standard. It is also envisioned that the drill driver 10 and the secondary computing device 602 may be interfaced using other wireless technologies such as infrared technology or WiFi wireless technology. In other embodiments, the secondary computing device 602 may be a stationary computing device, such as a laptop or desktop computer located remotely from the drill driver. In these embodiments, the drill driver 10 is interfaced through a network to the secondary computing device 602. Other means of interfacing the drill driver 10 with the secondary computing device 602, including a direct wired connection between the devices, also fall within the scope of this disclosure.

The secondary computing device 602 provides an intuitive and readily accessible means for the tool operator to tailor the operating parameters of the drill driver 10. In an example embodiment, the secondary computing device 602 is configured with a software application that enables the tool operator to input descriptors for a particular task that is being undertaken with the use of the drill driver 10 and subsequently download the descriptors to the drill driver 10. FIG. 12 depicts an example user interface which may be used to capture descriptors for fastening application. In the example shown, the tool operator may specify the type of fastener, the length of the fastener, the material of the workpiece and/or the size of the workpiece. Characteristics may also be presented as drill down elements with more specificity being identified at lower levels of the hierarchy. Once specified by the tool operator, the descriptors can be stored locally on the secondary computing device 602. It is readily understood that the types of descriptors will vary depending on the particular task. The format and layout of the user interface is merely exemplary and not intended to be limiting.

Descriptors for the fastening application are subsequently transferred from the secondary computing device 602 to the drill driver 10. For example, assuming the drill driver 10 and secondary computing device 602 have been properly paired, the descriptors for the fastening application may be transferred immediately upon receipt from the tool operator via a wireless data link to the drill driver 10. The transfer process may occur with or without further intervention or input from the tool operator. In some instances, the transfer process is not initiated until the secondary computing device 602 is brought into close proximity of the drill driver 10. In other instances, the descriptors for the fastening application may be captured and stored by the secondary computing device 602 for a period of time and then transferred to the drill driver at some later time which may be scheduled or otherwise initiated by the tool operator.

Figure 13A:
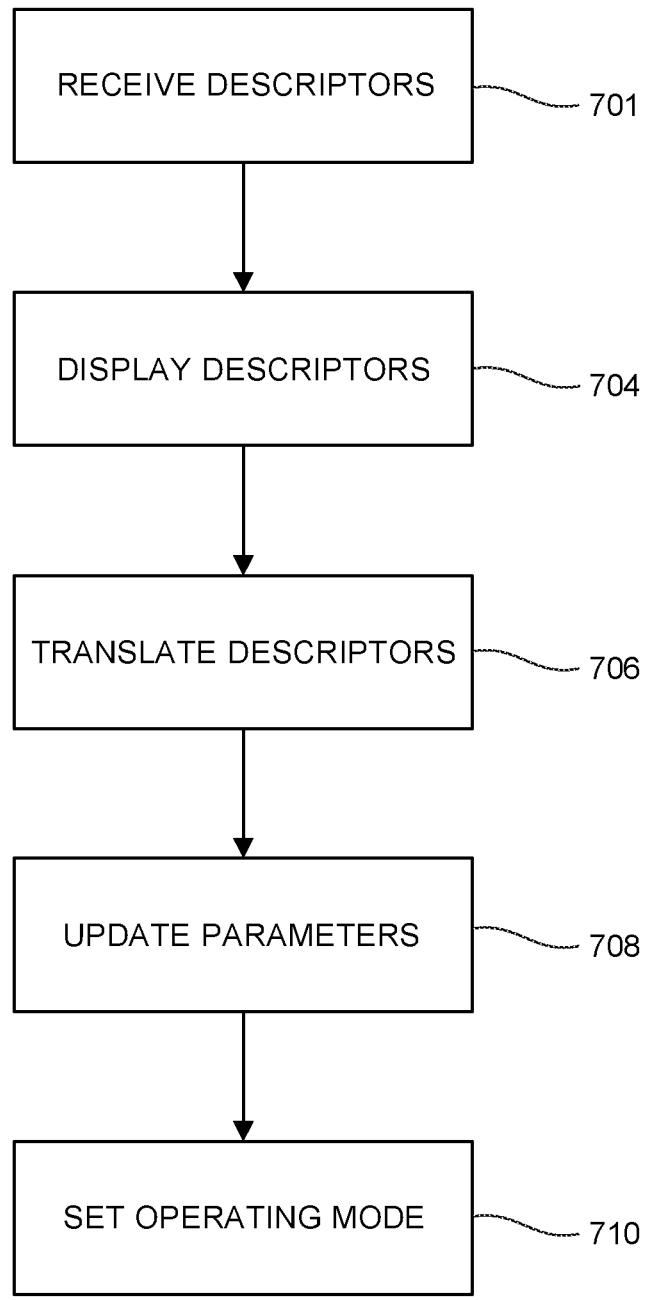
FIGS. 13A and 13B are flowcharts depicting how descriptors for a fastening application are handled by the drill driver.

FIG. 13A depicts an example embodiment of how the descriptors are handled by the drill driver 10. Descriptors from the fastening application are received at 701 and stored in a data store residing on the drill driver 10. The descriptors are then used to tailor the parameters of the fastener setting algorithm. Continuing with the fastener setting example set forth above, the descriptors are translated to a value for the minimum slope threshold. In an example embodiment, the descriptors serve as an input for a look-up table and the value for the minimum slope threshold is retrieved from the look-up table. An example look-up table is provided below.

| Fastener | Work Piece | Power Eff | Current Sample time | Current Slope | Battery Voltage |
|---|---|---|---|---|---|
| #8 1.5" Wood Screw | Pine only | 0% | 0 ms | 0 | 20 V |
| #6 1.5" Wood Screw | Pine only | 0% | 0 ms | −31 | 20 V |
| 6GA 3" Drywall Screw | Pressure Treated wood only | 0% | 0 ms | 0 | 20 V |
| 6GA 3" | Pressure Treated | +20% | −3 ms | +12 | 20 V |

-continued

| Fastener | Work Piece | Power Eff | Current Sample time | Current Slope | Battery Voltage |
|---|---|---|---|---|---|
| Drywall Screw 6GA 2" Drywall Screw | wood only Drywall to Pressure Treated wood | 0% | 0% | +12 | 20 V |
| *8GA 2" Drywall Screw | Drywall to Pressure Treated wood | 0% | 0% | +57 | 20 V |

In this embodiment, the values in the look-up table are offsets to a baseline value although the threshold values themselves could also be stored in the look-up table. In the case of #8 wood screw being driven into a piece of pine, an offset value of zero is retrieved from the look-up table and thus no adjustment is needed to the baseline value of the minimum slope threshold. In the case of #6 wood screw being driven into a piece of pine, an offset value of −31 is retrieved from the look-up table and used to lower the baseline value of the minimum slope threshold, for example from 68 to 37. In the case of a 6 GA drywall screw being driven into a piece of pressure treated wood, an offset value of +12 is retrieved from the look-up table and used to increase the baseline value of the minimum slope threshold, for example from 68 to 80. From these examples, it can be seen how the minimum slope threshold can be tailored using descriptors of the fastening application. It is envisioned that other parameters of the fastener setting algorithm, such as the number of increasing slope counts defining the setting criteria, can also be tailored either independently or in combination with the minimum slope threshold in a similar manner using the descriptors for the fastening application. Methods for translating the descriptors to parameter values for the fastener setting algorithm other than using a look-up table also fall within the broader aspects of this disclosure.

Descriptors for the fastening application can also be used to tailor other operating parameters of the drill driver. For example, it may be advantageous to increase the sampling rate of the current being delivered to the motor to ensure a more precise or timely determination of the current slope. With continued reference to the look-up table above, an offset of −3 ms is retrieved from the look-up table for a 6 GA drywall screw being driven into a piece of pressure treated wood. In addition to the minimum slope threshold, the baseline sample rate can be decreased, for example from a baseline value of 15 ms to 12 ms. In another example, it may also be advantageous to increase the motor speed in order to increase work efficiency in certain applications. For drill drivers having two operating modes, such as a drill mode and a drive mode as described above, the motor speed may be limited to a percentage (e.g., 60%) of the maximum speed. In the case of a 6 GA drywall screw being driven into a piece of pressure treated wood, an offset value of +20% for power efficiency is also retrieved from the look-up table and used to increase the maximum motor speed, for example from 60% to 80%. Adjustments to other types of tool operating parameters are also contemplated within the broader aspects of this disclosure.

With continued reference to FIG. 13A, offset values retrieved from the look-up table are applied to the baseline values of the operating parameters as indicated at 708. That is, the memory space containing for example the minimum slope threshold is updated using the offset value. In the case of a drill driver having multiple operating modes, the receipt of the descriptors may also trigger an update of the operating mode as indicated at 710. For example, the clutch setting for the electronic clutch may be changed from a drill mode to a drive mode (or more particularly to an automated drive mode) in response to receiving the descriptors from the secondary computing device. In this way, the drill driver 10 is configured in an automated way for the particular fastening application.

Given the automated configuration of drill driver, it is advisable that the tool operator be made aware of the configuration. In this embodiment, an indicia of the configuration is presented at 704 on a display of the drill driver 12, where the indicia is presented in response to the drill driver receiving the descriptors from the secondary computing device. The indicia may be an icon or a message indicating that use of a customized fastener setting algorithm. Alternatively or additionally, the indicia may specify the descriptors for the fastening application and/or current clutch setting for the electronic clutch.

Figure 13B:
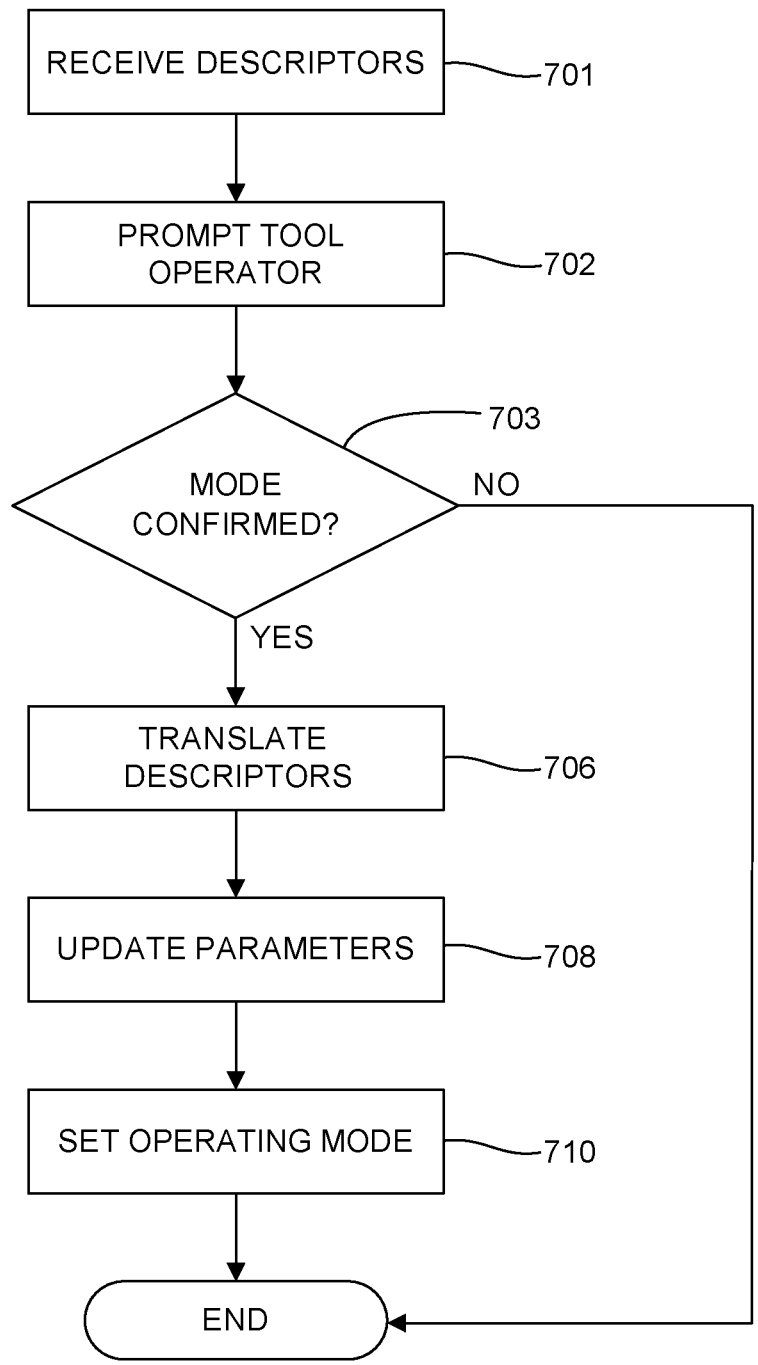

In an alternative embodiment, the tool operator may be prompted before the tool is re-configured as indicated at 702 of FIG. 13B. For example, a message may be displayed on a display of the drill driver asking the tool operator to confirm the update to operating parameters. The message may include indicia for the descriptors of the fastening application and/or the new clutch setting for the electronic clutch. If the tool operator confirms the re-configuring of the tool, steps are taken to re-configure to the tool in the same manner as described in relation to FIG. 13A; otherwise, the process is terminated without the tool being re-configured. It is to be understood that only the relevant steps of the technique are discussed in relation to FIGS. 13A and 13B, but that other software-implemented instructions may be needed to implement the technique within the overall operation of the tool.

Once the drill driver has been configured, the tool operator can proceed with the fastening application. During the fastening operation, an operating parameter of the tool, such as current, is monitored and evaluated in relation to the re-configured parameters of the fastener setting algorithm. In some embodiments, the re-configured parameters may be used during a single operation before being reverted to the baseline values. In other embodiments, the re-configured parameters may be used in subsequent operations until some triggering event occurs. For example, the tool operator may reset the parameter values to baseline values by depressing the drill button 46 and the drive button 47 simultaneously for a predefined period of time (e.g., one second). In another example, the parameters may be reset to baseline values after a predefined period of time (e.g., 5 minutes or 30 minutes). In any case, the tool operator is also provided with a visual indication (e.g., blinking LEDs) that the parameters have been reset. Other types of triggering events for resetting the parameters values and visual cues are contemplated by this disclosure.

Figure 14:
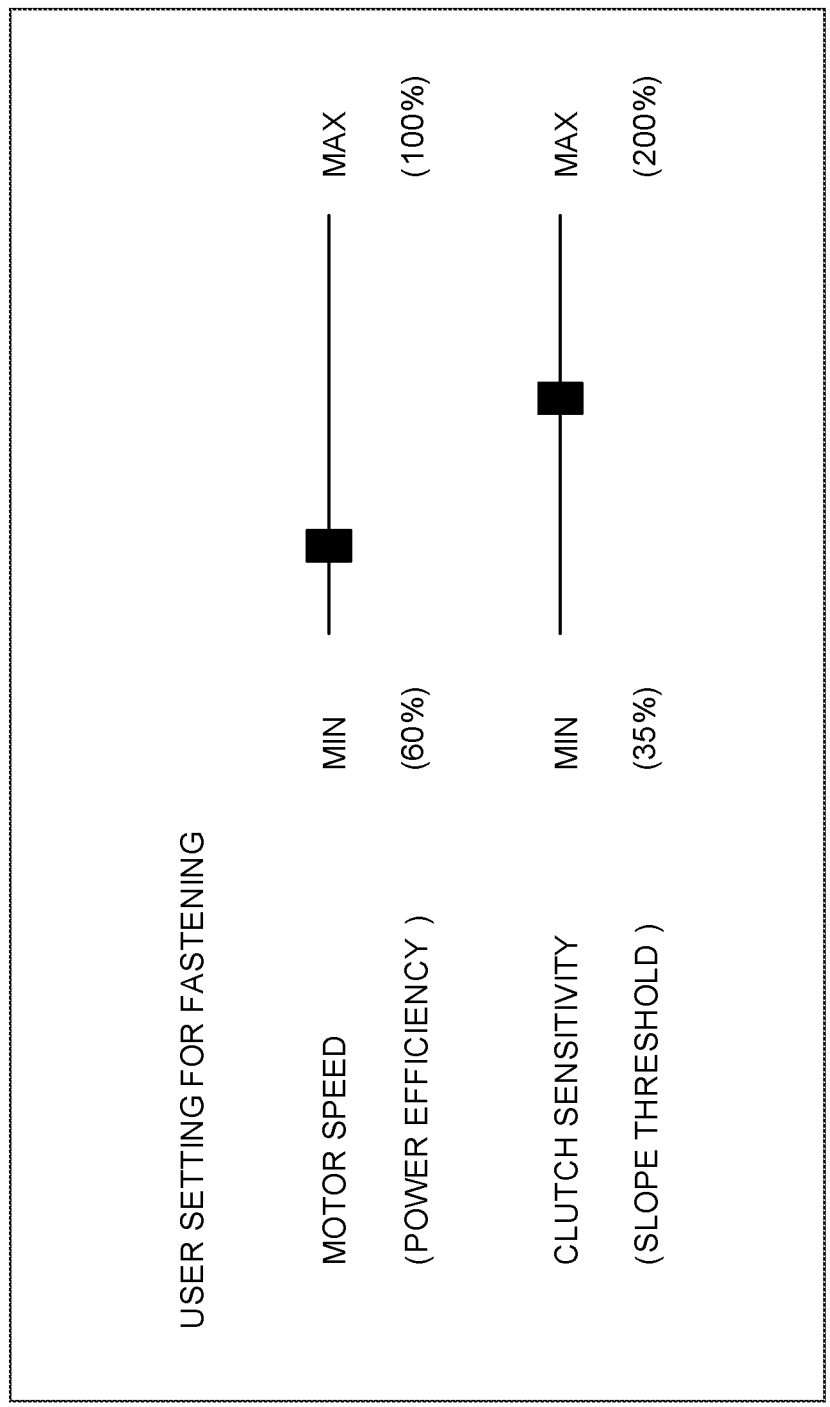
FIG. 14 is an example user interface which may be used by the tool operator to manually set operating parameters of the drill driver.

Additionally, the drill driver 10 may be further configured such that the tool operator can override or manually set a parameter of the fastener setting algorithm or another operating parameter of the drill driver. FIG. 14 depicts an example user interface which may be used by the tool operator to manually set parameters, such as the minimum slope threshold and power efficiency (i.e., percentage of maximum motor speed). This interface is merely exemplary and other arrangements can be implemented to adjust these or other operating parameters. The drill driver 10 uses the manually set parameters values for the next task performed by the tool, for a pre-defined period of time or until another trigger resets the parameters to baseline values.

The techniques described herein may be implemented by one or more computer programs executed by one or more processors residing in a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool system, comprising:
a power tool; and
a secondary computing device;
wherein the power tool comprises a housing, a controller, a first wireless transceiver, a motor, and a tool output;
wherein the tool output is configured to be selectively driven by the motor;
wherein the secondary computing device comprises a second wireless transceiver configured to allow wireless communication between the power tool and the secondary computing device;
wherein the secondary computing device further comprises a user interface configured to allow an operator to change at least a first operating parameter of the power tool;
wherein the first operating parameter relates to motor speed;
wherein the first operating parameter is configured to be automatically reset to a baseline upon a triggering event; and
wherein the power tool system is configured such that the operator is prompted to confirm a change to the first operating parameter.

2. A power tool system, comprising:
a power tool,
a secondary computing device;
wherein the power tool comprises a housing, a controller, a first wireless transceiver, a motor, and a tool output;
wherein the tool output is configured to be selectively driven by the motor;
wherein the secondary computing device comprises a second wireless transceiver configured to allow wireless communication between the power tool and the secondary computing device;
wherein the secondary computing device further comprises a user interface configured to allow an operator to change at least a first operating parameter of the power tool;
wherein the first operating parameter relates to a clutch;
wherein the first operating parameter is configured to be automatically reset to a baseline upon a triggering event; and
wherein the power tool system is configured such that the operator is prompted to confirm a change to the first operating parameter.

3. A power tool comprising:
a housing;
a motor in the housing;
a tool output configured to be selectively driven by the motor;
a manually depressible trigger configured to operate the motor;
a user actuable first selector switch;
a user actuable second selector switch;
a controller;
a wireless transceiver connected to the controller;
wherein the wireless transceiver is configured to wirelessly interface with a secondary computing device into which a user may input at least one of a fastener type, a fastener length, or a workpiece type; and
wherein at least one operating parameter of the power tool is adjusted based upon the user input of at least one of a fastener type, a fastener length, or a workpiece type.

4. The power tool of claim 3, wherein the at least one of a fastener type, a fastener length, or a workpiece type comprises at least a fastener type.

5. The power tool of claim 3, wherein the at least one of a fastener type, a fastener length, or a workpiece type comprises at least a fastener length.

6. The power tool of claim 3, wherein the at least one of a fastener type, a fastener length, or a workpiece type comprises at least a workpiece type.

7. The power tool of claim 3, wherein the at least one operating parameter of the power tool is adjusted immediately based upon the user input of the at least one of a fastener type, a fastener length, or a workpiece type.

8. The power tool of claim 3, wherein the at least one operating parameter of the power tool is adjusted based upon the user input of the at least one of a fastener type, a fastener length, or a workpiece type after further intervention from the user.

9. The power tool of claim 3, wherein the first selector switch is adjacent to the second selector switch.

10. The power tool of claim 9, wherein the first selector switch illuminates upon actuation.

11. The power tool of claim 3, wherein the at least one operating parameter comprises a speed parameter.

12. The power tool of claim 3, wherein the at least one operating parameter comprises a clutch parameter.

13. The power tool of claim 3, wherein the at least one operating parameter comprises an update of an operating mode.

14. A power tool comprising:
a body including a handle shaped to be grasped by a user;
a battery mounting portion configured to receive a rechargeable battery pack;
a motor;
a tool output configured to be selectively driven by the motor;
a manually depressible trigger configured to operate the motor;
a circuit board;
a controller on the circuit board, the controller configured to perform multiple functions of the power tool, and comprising at least one electrically erasable programmable read-only memory function providing storage of data or selected inputs from a user of the power tool;
a wireless transceiver connected to the controller;
wherein the wireless transceiver is configured to wirelessly interface with a secondary computing device into which a user may input at least one of a fastener type, a fastener length, or a workpiece type; and
wherein at least one operating parameter of the power tool is adjusted based upon the user input of at least one of a fastener type, a fastener length, or a workpiece type.

15. The power tool of claim 14, further comprising a user actuable first selector switch and a user actuable second selector switch adjacent to the user actuable first selector switch.

16. The power tool of claim 14, wherein the at least one of a fastener type, a fastener length, or a workpiece type comprises at least a fastener type.

17. The power tool of claim 14, wherein the at least one of a fastener type, a fastener length, or a workpiece type comprises at least a fastener length.

18. The power tool of claim 14, wherein the at least one of a fastener type, a fastener length, or a workpiece type comprises at least a workpiece type.

19. The power tool of claim 14, wherein the at least one operating parameter of the power tool is adjusted immediately based upon the user input of the at least one of a fastener type, a fastener length, or a workpiece type.

20. The power tool of claim 14, wherein the at least one operating parameter of the power tool is adjusted based upon the user input of the at least one of a fastener type, a fastener length, or a workpiece type after further intervention from the user.

* * * * *